(12) United States Patent
Kawai et al.

(10) Patent No.: US 7,374,607 B2
(45) Date of Patent: *May 20, 2008

(54) WATER-BASED INK SET FOR INK-JET RECORDING AND INK-JET RECORDING METHOD

(75) Inventors: Narumi Kawai, Nagoya (JP); Narumi Koga, Nagoya (JP); Tomoyo Hamajima, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/488,582

(22) Filed: Jul. 18, 2006

(65) Prior Publication Data
US 2007/0046750 A1    Mar. 1, 2007

(30) Foreign Application Priority Data
Aug. 26, 2005    (JP)    ............................ 2005-246870

(51) Int. Cl.
*C09D 11/00* (2006.01)
*C09D 11/02* (2006.01)
*B41J 2/01* (2006.01)

(52) U.S. Cl. .................. 106/31.27; 106/31.6; 347/100

(58) Field of Classification Search ............. 106/31.27, 106/31.6; 347/100
See application file for complete search history.

(56) References Cited

U.S. PATENT DOCUMENTS 5,837,045 A     11/1998   Johnson et al.
6,843,840 B2 *  1/2005    Kataoka et al. ............. 106/31.6
2005/0235867 A1* 10/2005  Jackson et al. ........... 106/31.27
2005/0284329 A1* 12/2005  Jackson et al. ............. 106/31.6
2006/0011095 A1*  1/2006  Kabalnov et al. ......... 106/31.27
2006/0132567 A1*  6/2006  Kawai et al. ................ 347/100
2006/0132810 A1*  6/2006  Hamajima et al. ........... 358/1.9
2006/0238589 A1* 10/2006  Koga et al. .................. 347/100
2006/0238590 A1* 10/2006  Koga et al. .................. 347/100
2007/0046749 A1*  3/2007  Kawai et al. ................ 347/100
2007/0046751 A1*  3/2007  Hamajima et al. .......... 347/100
2007/0046752 A1*  3/2007  Hamajima et al. .......... 347/100

FOREIGN PATENT DOCUMENTS

| JP | 1095093 | 4/1989 |
|---|---|---|
| JP | 2127482 | 5/1990 |
| JP | 8003498 | 1/1996 |
| JP | 2000-513396 | 10/2000 |

* cited by examiner

*Primary Examiner*—Helene Klemanski
(74) *Attorney, Agent, or Firm*—Reed Smith LLP

(57) ABSTRACT

A water-based ink set for ink-jet recording is provided which is capable of: reducing graininess in a low-density printed part in a cyan direction without reducing the color reproduction range in the cyan direction in a high-density printed part; extending the color reproduction range in a blue direction and/or a green direction; improving the vividness of the blue color and/or the green color; and improving gas resistance in a printed part in the cyan direction. The water-based ink set for ink-jet recording includes a cyan pigment ink employing pigment as a coloring agent and a blue dye ink employing dye as a coloring agent and/or a green dye ink employing dye as a coloring agent. The cyan pigment ink is a light cyan pigment ink having a lightness (L*) of about 60 or more in the L*a*b* colorimetric system.

16 Claims, No Drawings

WATER-BASED INK SET FOR INK-JET RECORDING AND INK-JET RECORDING METHOD

BACKGROUND OF THE INVENTION

1. Field of the Invention

The present invention relates to a water-based ink set for ink-jet recording suitable for reducing graininess in a low-density printed part, for improving gas resistance, and for extending a color reproduction range. The present invention also relates to an ink-jet recording method using this water-based ink set for ink-jet recording.

2. Description of the Related Art

When a color image is formed by use of an ink-jet recording method, a three-color ink set has been generally used which is composed of a yellow ink (Y), a magenta ink (M) and a cyan ink (C). Alternatively, a four-color ink set has also been used in which a black ink (K) is further added to the three-color ink set.

Generally, in an ink-jet recording method, the gradation of an image is controlled by adjusting the density of dots formed by ejecting ink onto a recording material. However, when the gradation is controlled by such a method, the dot density decreases in a low-density printed part. Relative to this, the individual dots become easily discernable to the eye, thereby causing a problem that the image is grainy.

In view of the above, a method has been proposed in which two or more inks are employed as cyan ink (see Japanese Patent Application Laid-Open No. H01-95093). In this method, these inks have different dye concentrations and are composed of different kinds of dyes. In addition, a dye which is excellent in vividness but inferior in light fastness is employed in a dark color ink, and a dye which is excellent in light fastness but inferior in vividness is employed in a light color ink. Moreover, a similar method has been proposed for magenta ink (see Japanese Patent Application Laid-Open No. H02-127482). According to these methods, graininess can be improved, but a problem remains that a color reproduction range cannot be extended. Further, when dye ink is employed, color fading first occurs in a low-density printed part, and thus only the low-density printed part becomes whitish to cause the overall image balance to be lost. Therefore, gas resistance, particularly ozone resistance, of a printed part is important.

Generally, in a three-color ink set composed of yellow, magenta and cyan inks, and also in a four-color ink set in which a black ink is added to the three-color ink set, blue color is developed by use of the cyan ink and the magenta ink. When these two inks are used to develop blue color as above, a problem arises that sharp printing quality and vivid color development are difficult to achieve due to a landing error of superposition. A similar problem arises when green color is developed by use of the cyan ink and the yellow ink.

SUMMARY OF THE INVENTION

The present invention has been made to solve the above-mentioned problems. Objects of the present invention are, in an ink-jet recording method:

(i) to reduce graininess in a low-density printed part in a cyan direction without reducing the color reproduction range in the cyan direction in a high-density printed part and with minimizing the number of inks composing an ink set;

(ii) in a blue direction and/or a green direction, to extend the color reproduction range and to enhance vividness; and (iii) to improve gas resistance in the cyan direction and the blue direction and/or the green direction.

The present inventors have conducted extensive studies on a water-based ink set for ink-jet recording. The studies are based on the hypothesis that the lightness (L*), the hue angle (h) and the chroma (C*) of the inks constituting the ink set are closely related to reducing graininess in a low-density printed part of a color image and to extending a color reproduction range. Here, the lightness (L*), the hue angle (h) and the chroma (C*) are based on L*a*b* colorimetric system. Consequently, the present inventors have found that, in a water-based ink set for ink-jet recording having a cyan ink, the above-mentioned objects (i), (ii) and (iii) can be achieved by employing a light cyan pigment ink as the cyan ink and also employing a blue dye ink and/or a green dye ink. This light cyan pigment ink employs pigment as a coloring agent, has a lightness (L*) of a specific value or more, and is employed in place of a normal cyan ink employed in a conventional ink set. Also, these blue and green dye inks employ dye as a coloring agent. Thus, the present invention has been completed.

Accordingly, the present invention provides a water-based ink set for ink-jet recording comprising a cyan pigment ink employing pigment as a coloring agent and a blue dye ink employing dye as a coloring agent and/or a green dye ink employing dye as a coloring agent. This ink set is characterized in that the cyan pigment ink is a light cyan pigment ink having a lightness (L*) of about 60 or more in the L*a*b* colorimetric system.

In addition, the present invention provides an ink-jet recording method employing the above-mentioned water-based ink set for ink-jet recording.

The water-based ink set for ink-jet recording of the present invention comprises, as a cyan ink, a light cyan pigment ink which contains a low concentration of pigment as a coloring agent. Therefore, when ink-jet recording is performed by use of this ink set, the graininess of a low-density printed part in a cyan direction can be reduced.

Also, since the coloring agent of the light cyan ink is pigment, excellent gas resistance is obtained in a printed part in the cyan direction, and color fading and discoloration can be prevented even when the density of cyan color is low.

In addition, this light cyan pigment ink may be ejected on a blue-printed part and/or a green-printed part. In this manner, gas resistance in a blue direction and/or a green direction can be improved with little change in the hue of blue color and/or green color.

The ink set of the present invention in one aspect comprises the blue dye ink together with the light cyan pigment ink. In this aspect, the color reproduction range in a cyan direction is not reduced in a high-density printed part, and the color reproduction range in a blue direction is significantly extended. In addition, since the coloring agent of the blue ink is dye, blue color having a high chroma can be reproduced. Further, since blue color is not developed by color mixing of a cyan ink and a magenta ink but can be developed by the blue dye ink alone, the vividness of blue color is improved. Generally, blue color is the second most frequently used color next to black color and red color when text including letters, symbols and ruled lines is printed. Thus, according to the present invention, the text in blue color can be printed with the single blue dye ink but not with two inks superposed thereon. Therefore, feathering is suppressed, and sharp print quality can be achieved.

The ink set of the present invention in another aspect comprises the green dye ink together with the light cyan pigment ink. In this aspect, the color reproduction range in the cyan direction is not reduced in a high-density printed part, and the color reproduction range in a green direction is significantly extended. In addition, since the coloring agent of the green ink is dye, green color having a high chroma can be reproduced. Further, since green color is not developed by color mixing of a cyan ink and a yellow ink but can be developed by the single green dye ink, the vividness of green color is improved.

Hence, in an aspect of the ink set of the present invention in which all of the light cyan pigment ink, the blue dye ink and the green dye ink are provided, the following effects can be obtained: the reduction of graininess in a low-density printed part in the cyan direction; the improvement of gas resistance; the prevention of the reduction of the color reproduction range in the cyan direction in a high-density printed part; the significant extension of the color reproduction ranges in the blue and green directions; and the improvement of the vividness of blue and green colors. Further, the above effects can be attained by use of the three inks including the light cyan pigment ink, the blue dye ink and the green dye ink.

DETAILED DESCRIPTION OF THE PREFERRED EMBODIMENTS

The present invention will next be described in detail.

In the present invention, lightness (L*), hue angle (h) and chroma (C*) are defined based on the L*a*b* colorimetric system standardized by the Commission Internationale de l'Eclairage (CIE) in 1976. This colorimetric system is also defined in Japanese Industrial Standards (JIS Z 8729).

In the present invention, the lightness (L*) is a lightness value in an object solidly printed at a resolution of 1200× 1200 dpi with each of the inks on glossy paper and is obtained by means of a spectrocolorimeter or a similar apparatus. Also, the hue angle (h) and the chroma (C*) are the respective values in the same solidly printed object. In this case, first, color indices (a* and b*) are obtained by means of a spectrocolorimeter or a similar apparatus, and the hue angle (h) and the chroma (C*) are calculated from the following equations (1) and (2) using the obtained a* and b*.

$$C^* = \sqrt{(a^*)^2 + (b^*)^2} \quad \text{Equation (1)}$$

$$h = \tan^{-1}\left(\frac{b^*}{a^*}\right) \quad (\text{when } a^* \geq 0 \text{ and } b^* \geq 0) \quad \text{Equation (2)}$$

$$h = 360 + \tan^{-1}\left(\frac{b^*}{a^*}\right) \quad (\text{when } a^* \geq 0 \text{ and } b^* < 0)$$

$$h = 180 + \tan^{-1}\left(\frac{b^*}{a^*}\right) \quad (\text{when } a^* < 0)$$

The "glossy paper" employed in the measurement of the L*, a* and b* values is paper having a coat layer for surface smoothness provided on base paper (body paper). Specific examples of the glossy paper include KASSAI (a registered trade mark) glossy finishing (product of FUJI Photo Film Co., Ltd.), ink-jet printer paper (glossy paper, product of KOKUYO Co., Ltd.), thick glossy paper (product of Kodak Co., Ltd.) and the like. The term "object solidly printed at a resolution of 1200×1200 dpi" refers to an area which is printed at a resolution of 1200×1200 dpi so as to be fully covered with ink. An ink-jet printer is employed for printing, and examples of the ink-jet printer include a digital multi-function device equipped with an ink-jet printer (MFC-5200J, product of Brother Industries, Ltd.) and the like.

Examples of the spectrocolorimeter which can be used include Spectrolino (product of Gretag Macbeth) and the like. The measurement is performed by use of a light source $D_{65}$ at a viewing angle of 2°.

The water-based ink set for ink-jet recording of the present invention comprises a cyan pigment ink and a blue dye ink and/or a green dye ink, and is characterized in that the cyan pigment ink is a light cyan pigment ink having a lightness (L*) of about 60 or more. Therefore, a normal cyan ink having a lightness (L*) of less than about 60 is not included in the ink set of the present invention. If this normal cyan ink having a lightness (L*) of less than about 60 is employed as the cyan ink, graininess is noticeable in a low-density printed part in the cyan direction. Thus, this normal cyan ink is not preferable as the cyan ink.

Preferably, the light cyan pigment ink constituting the ink set of the present invention has a lightness (L*) of about 60 or more and about 85 or less. The light cyan pigment ink having a lightness (L*) exceeding about 85 is not preferable, since the original cyan color is difficult to reproduce.

Preferably, the hue angle (h) of the light cyan pigment ink is adjusted within the range of from about 215° to about 255°. If the hue angle (h) is not within this range, cyan color is not satisfactorily developed.

Further, preferably, the chroma (C*) of the light cyan pigment ink is adjusted within the range of from about 40 to about 70. By adjusting the chroma (C*) within this range, cyan color can be reproduced vividly.

Preferably, the blue dye ink constituting the ink set of the present invention has a lightness (L*) of about 45 or less. The blue dye ink having a lightness (L*) exceeding about 45 is not preferable, since the original blue color is difficult to reproduce. More preferably, the lightness (L*) of the blue dye ink falls within the range of from about 35 to about 45. By adjusting the lightness (L*) of the blue dye ink within this range, blue and cyan colors can be reproduced at a satisfactory density.

Preferably, the hue angle (h) of the blue dye ink is adjusted within the range of from about 270° to about 285°. By adjusting the hue angle (h) within this range, blue color can be satisfactorily developed.

Further, preferably, the chroma (C*) of the blue dye ink is adjusted within the range of from about 70 to about 80. By adjusting the chroma (C*) within this range, vivid blue color can be developed.

Meanwhile, preferably, the green dye ink constituting the ink set of the present invention has a lightness (L*) of about 60 or less. The green dye ink having a lightness (L*) exceeding about 60 is not preferable, since the original green color is difficult to reproduce. More preferably, the lightness (L*) of the green dye ink falls within the range of from about 35 to about 60. By adjusting the lightness (L*) of the green dye ink within this range, green and cyan colors can be reproduced at a satisfactory density.

Preferably, the hue angle (h) of the green dye ink is adjusted within the range of from about 175° to about 215°. By adjusting the hue angle (h) within this range, green color can be satisfactorily developed.

Further, preferably, the chroma (C*) of the green dye ink is adjusted within the range of from about 60 to about 80. By adjusting the chroma (C*) within this range, vivid green color can be reproduced.

The ink set of the present invention may include either of the blue dye ink or the green dye ink in addition to the light cyan pigment ink or may include all of the above inks. Further, the ink set of the present invention may include any additional ink in addition to the light cyan pigment ink and the blue dye ink and/or the green dye ink. For example, a yellow ink and/or a magenta ink may be included in the ink set. A black ink may be included in accordance with need. A full color image can be reproduced by including the yellow ink, the magenta ink, and, if necessary, the black ink in addition to the light cyan pigment ink and the blue dye ink and/or the green dye ink.

In case that the magenta ink is included in the ink set of the present invention, a normal magenta ink employed in a known ink set may be employed as the magenta ink. However, preferably, a light magenta ink having a lightness (L*) of about 50 or more is employed in place of the normal magenta ink, and a red ink is also employed. In this case, a normal magenta ink having a lightness (L*) of less than 50 is unnecessary. By employing the light magenta ink having a lightness (L*) of about 50 or more as the magenta ink, graininess can be reduced in a low-density printed part in the magenta direction. Preferably, the lightness (L*) of the light magenta ink falls within the range of from about 50 to about 65. The light magenta ink having a lightness (L*) exceeding about 65 is not preferable, since the original magenta color is difficult to reproduce.

Preferably, the hue angle (h) of the light magenta ink is adjusted within the ranges of from about 335° to about 360° or from about 0° to about 5°. If the hue angle (h) is not set in this range, it is difficult to satisfactorily develop magenta color.

Further, preferably, the chroma (C*) of the light magenta ink is adjusted within the range of from about 80 to about 90. By adjusting the chroma (C*) within the above range, magenta color can be reproduced vividly.

Preferably, the red ink constituting the ink set of the present invention together with the light magenta ink has a lightness (L*) of about 50 or less. If the lightness (L*) of the red ink exceeds about 50, it is difficult to obtain a sufficient color reproduction range in the red direction. More preferably, the lightness (L*) of the red ink falls within the range of from about 25 to about 50. By adjusting the lightness (L*) of the red ink within this range, red and magenta colors can be reproduced at a satisfactory density.

Preferably, the hue angle (h) of the red ink is adjusted within the range of from about 20° to about 35°. By adjusting the hue angle (h) within this range, red color can be satisfactorily developed.

Further, preferably, the chroma (C*) of the red ink is adjusted within the range of from about 80 to about 90. By adjusting the chroma (C*) within this range, red color can be reproduced vividly.

Furthermore, at least one of the coloring agents of the light magenta ink and the red ink may be a pigment.

In case that a yellow ink or a black ink is included in the ink set of the present invention, an ink employed in a known ink set may be employed as these inks. For example, a normal yellow ink having the hue angle (h) of from about 70° to about 140° may be employed as the yellow ink.

Each of the inks constituting the ink set of the present invention contains a coloring agent, water and a water soluble organic solvent so as to have L*, h and C* of the predetermined values described above.

Water soluble dye or pigment may be employed as the coloring agent contained in the inks. A proper combination of these may be employed to adjust the inks to have the predetermined ink color.

Representative examples of the water soluble dye employed include direct dyes, acid dyes, basic dyes, reactive dyes and the like. Also, examples of the preferable water soluble dye include, in view of a chemical structure, azo dyes, metal complex dyes, naphthol dyes, anthraquinone dyes, indigo dyes, carbonium dyes, quinoneimine dyes, xanthene dyes, aniline dyes, quinoline dyes, nitro dyes, nitroso dyes, benzoquinone dyes, naphthoquinone dyes, phthalocyanine dyes, metal phthalocyanine dyes and the like. Particularly, examples of the water soluble dye which is suitable as the ink for an ink-jet recording method and satisfies the required properties such as vividness, water solubility, stability and light fastness include, but are not limited to: direct dyes such as C. I. Direct Yellows 12, 24, 26, 27, 28, 33, 39, 58, 86, 98, 100, 132 and 142, C. I. Direct Reds 4, 17, 28, 37, 63, 75, 79, 80, 81, 83 and 254, C. I. Direct Violets 47, 48, 51, 90 and 94, C. I. Direct Blues 1, 6, 8, 15, 22, 25, 71, 76, 80, 86, 87, 90, 106, 108, 123, 163, 165, 199 and 226, C. I. Direct Greens 1, 26, 28, 59, 80 and 85, and the like; acid dyes such as C. I. Acid Yellows 3, 11, 17, 19, 23, 25, 29, 38, 42, 49, 59, 61, 71 and 72, C. I. Acid Reds 1, 6, 8, 18, 32, 35, 37, 42, 52, 85, 88, 115, 133, 134, 154, 186, 249, 289 and 407, C. I. Acid Violets 10, 34, 49 and 75, C. I. Acid Blues 9, 22, 29, 40, 59, 62, 93, 102, 104, 112, 113, 117, 120, 167, 175, 183, 229 and 234, C. I. Acid Greens 3, 5, 9, 12, 15, 16, 19, 25, 27, 28, 36, 40, 41, 43, 44, 56, 73, 81, 84, 104, 108 and 109, and the like; basic dyes such as C. I. Basic Yellow 40, C. I. Basic Reds 9, 12 and 13, C. I. Basic Violets 7, 14 and 27, C. I. Basic Blues 1, 3, 5, 7, 9, 24, 25, 26, 28 and 29, C. I. Basic Greens 1 and 4, and the like; and reactive dyes such as C. I. Reactive Yellow 2, C. I. Reactive Reds 4, 23, 24, 31 and 56, C. I. Reactive Blues 7, 13 and 49, C. I. Reactive Greens 5, 6, 7, 8, 12, 15, 19 and 21, and the like.

In addition, examples of the pigment include, but are not limited to, C. I. Pigment Yellows 1, 2, 3, 13, 16, 74, 83, 93, 128, 134 and 144, C. I. Pigment Reds 5, 7, 12, 23, 48 (Mn), 57 (Ca), 112, 122, 144, 170, 177, 221, 254 and 264, C. I. Pigment Violets 19, 23 and 48 (Ca), C. I. Pigment Blues 1, 2, 3, 15, 15:1, 15:2, 15:3, 15:4, 15:5, 15:6, 16, 17:1, 22, 27, 28, 29, 36 and 60, C. I. Pigment Green 7, and the like.

Water soluble dye or pigment may be employed as the coloring agent of the black ink, and a proper combination thereof may also be employed. Examples of the water soluble dye include, but are not limited to: direct dyes such as C. I. Direct Blacks 17, 19, 32, 51, 71, 108, 146, 154 and 168, and the like; acid dyes such as C. I. Acid Blacks 2, 7, 24, 26, 31, 52, 63, 112 and 118, and the like; basic dyes such as C. I. Basic Black 2, and the like; C. I. Food Blacks 1 and 2, and the like. Examples of the pigment which can be employed include carbon blacks such as MA8, MA100 (products of Mitsubishi Chemical Corporation), and color black FW200 (product of Degussa). A self-dispersing type carbon black which can disperse in water without using a dispersing agent may be employed as the carbon black. A self-dispersing type carbon black can be obtained by subjecting a carbon black to a surface treatment such that at least one hydrophilic group such as a carbonyl group, a carboxyl group, a hydroxyl group, or a sulfone group or a salt thereof is bound to the surface of the carbon black. Specific examples of the surface treatment include a method disclosed in U.S. Pat. No. 5,609,671 and a method disclosed in WO97/48769. Alternatively, a commercial product such as CAB-O-JET (a registered trade mark) 200, 300 (products of Cabot Corporation) or BONJET (a registered trade mark) CW1 (product of Orient Chemical Industries, Ltd.) may be employed as the self-dispersing black pigment.

The amount of the water soluble dye contained in the dye ink depends on the desired printing density and the desired color. If the amount is too low, the color is not satisfactorily developed on a recording material. On the other hand, if the amount is too high, a nozzle of an ink-jet head tends to be clogged. Thus, the amount of the water soluble dye with respect to the total weight of the corresponding ink is preferably about 0.1 wt. % to about 15 wt. %, more preferably about 0.3 wt. % to about 10 wt. %, and particularly preferably about 0.5 wt. % to about 5.0 wt. %.

The amount of the pigment contained in the pigment inks depends on the desired printing density and the desired color. If the amount is too low, the color is not satisfactorily developed on a recording material. On the other hand, if the amount is too high, a nozzle of an ink-jet head tends to be clogged. Thus, the amount of the pigment with respect to the total weight of the corresponding ink is preferably about 0.2 wt. % to about 15 wt. %, and more preferably about 0.2 wt. % to about 10 wt. %.

Preferably, the water employed in the inks is deionized water. The amount of the water is determined based on the kind of the water soluble organic solvent, the composition of the ink, and the desired ink properties. If the amount of the water is too low, the viscosity of the ink increases to cause difficulty in ejecting the ink from a nozzle of an ink-jet head. On the other hand, if the amount is too high, the coloring agent is precipitated or aggregated due to the evaporation of water, and thus a nozzle of an ink-jet head tends to be clogged. Therefore, the amount of the water with respect to the total weight of the corresponding ink is preferably about 10 wt. % to about 95 wt. %, more preferably about 10 wt. % to about 90 wt. %, and particularly preferably about 20 wt. % to about 80 wt. %.

The water soluble organic solvents employed in the inks are broadly categorized into a humectant and a penetrant.

The humectant is added to the ink for preventing clogging of a nozzle of an ink-jet head. Specific examples of the humectant include, but are not limited to, water soluble glycols such as glycerin, ethylene glycol, diethylene glycol, triethylene glycol, polyethylene glycol, propylene glycol, dipropylene glycol, tripropylene glycol, polypropylene glycol, 1,5-pentanediol, 1,6-hexanediol and the like. If the amount of the water soluble organic solvent serving as the humectant is too low, the clogging of a nozzle of an ink-jet head is not satisfactorily prevented. On the other hand, if the amount is too high, the viscosity of the ink increases to cause difficulty in ejecting. Therefore, the amount of the water soluble organic solvent with respect to the total weight of the corresponding ink is preferably about 5 wt. % to about 50 wt. %, more preferably about 5 wt. % to about 40 wt. %, and particularly preferably about 5 wt. % to about 35 wt. %.

The penetrant is added to the ink for allowing the ink to rapidly penetrate into paper upon printing. Specific examples of the penetrant include glycol ethers typified by ethylene glycol-based alkyl ethers, propylene glycol-based alkyl ethers and the like. Specific examples of the ethylene glycol-based alkyl ether include ethylene, but are not limited to, glycol methyl ether, ethylene glycol ethyl ether, ethylene glycol-n-propyl ether, ethylene glycol-n-butyl ether, ethylene glycol isobutyl ether, diethylene glycol methyl ether, diethylene glycol ethyl ether, diethylene glycol-n-propyl ether, diethylene glycol-n-butyl ether, diethylene glycol isobutyl ether, triethylene glycol methyl ether, triethylene glycol ethyl ether, triethylene glycol-n-propyl ether, triethylene glycol-n-butyl ether, triethylene glycol isobutyl ether and the like. Specific examples of the propylene glycol-based alkyl ether include, but are not limited to, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol-n-ethyl ether, tripropylene glycol-n-propyl ether, tripropylene glycol-n-butyl ether and the like.

If the amount of the water soluble organic solvent serving as the penetrant is too low, the penetrability is unsatisfactory. On the other hand, if the amount is too high, the penetrability becomes excessively high, and thus blurring such as feathering tends to occur. Therefore, the amount of the water soluble organic solvent with respect to the total weight of the corresponding ink is preferably about 0.1 wt. % to about 10 wt. %, and more preferably about 0.1 wt. % to about 5 wt. %.

In addition to the above-described humectant and penetrant, the inks constituting the ink set of the present invention may contain a water soluble organic solvent to prevent drying of ink at the tip of an ink-jet head, to enhance printing density, and to help the development of vivid colors. Examples of such a water soluble organic solvent include, but are not limited to: lower alcohols such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones and keto-alcohols such as acetone, diacetone alcohol and the like; ethers such as tetrahydrofuran, dioxane and the like; glycerin; 2-pyrrolidone; N-methyl-2-pyrrolidone; 1,3-dimethyl-2-imidazolidinone; and the like.

Moreover, any conventionally known surfactants; viscosity modifiers such as polyvinyl alcohol, cellulose, water soluble resin and the like; surface tension modifiers; mildewproofing agents; or the like may be added to the inks constituting the ink set of the present invention in accordance with need.

The ink-jet recording method of the present invention performs ink-jet recording by use of the ink set of the present invention. No particular limitation is imposed on the type of the ink-jet recording method. Examples of the ink-jet recording method include, but are not limited to, an electrostatic suction method, a method using a piezoelectric element, and a thermal method.

In the ink-jet recording method of the present invention, the light cyan pigment ink may be employed on a recording material together with the blue dye ink and/or the green dye ink. In this case, the use ratio of the light cyan pigment ink to the blue dye ink and/or the green dye ink is preferably about 25% or more and about 75% or less in volume percentage. A use ratio of the light cyan pigment ink of less than about 25% is not preferable, since an improving effect on gas resistance of blue color and/or green color is low. In addition, a use ratio of the light cyan pigment ink of exceeding about 75% is not preferable, since the tone of blue color and/or green color is evidently changed. Of course, for colors which may be developed by the light cyan pigment ink alone, the blue dye ink and/or the green dye ink may not be employed together therewith.

When the light cyan pigment ink is employed on a recording material together with the blue dye ink and/or the green dye ink, the landing order of the inks is not particularly limited so long as the tone of the desired color can be reproduced. However, if the light cyan pigment ink is allowed to land in a superposing manner on a part recorded with the blue dye ink and/or a part recorded with the green dye ink, the light fastness is improved. This is because the amount of light reaching the dye molecules present in the lower layer decreases, since the pigment is present on the surface of the printed object. For a similar reason, the amount of oxides such as ozone which attack the dye molecules present in the lower layer decreases, thereby improving the gas resistance. On the other hand, if the blue dye ink and/or the green dye ink are/is allowed to land in a superposing manner on a part in a recording material on which part the light cyan pigment ink lands in advance, the color developing properties are improved by the light transparency of the dye molecules.

EXAMPLES

The present invention will next be specifically described by referring to Examples and Comparative Examples. In the present Examples, "%" refers to weight % unless otherwise specified.

Examples B1 to B6, Comparative Examples B1 to B7, Examples G1 to G4 and Comparative Examples G1 to G7

(1) Preparation of Inks

Light cyan pigment ink 1 having the ink composition shown in Table 1 was prepared as follows.

First, 5 parts by weight of C. I. Pigment Blue 15:3, 5 parts by weight of polyoxyethylene lauryl ether ammonium sulfate (average polymerization degree of oxyethylene=12), 15 parts by weight of glycerin and 75 parts by weight of water were mixed. Subsequently, the mixture was subjected to a dispersion treatment by means of a wet sand mill using zirconia beads having a diameter of 0.3 mm as a medium to thereby obtain 100 parts by weight of a cyan pigment dispersion.

Separately, 54 parts by weight of water, 24 parts by weight of glycerin and 2 parts by weight of dipropylene glycol-n-propyl ether (hereinafter referred to as DPGPE) were mixed to prepare 80 parts by weight of an ink solvent. Subsequently, 20 parts by weight of the above-described cyan pigment dispersion was weighed out from 100 parts by weight thereof, and 80 parts by weight of the prepared ink solvent was gradually added thereto under stirring. The mixture was continued to stir for 30 minutes and filtrated with a membrane filter having a pore size of 1 μm to prepare light cyan pigment ink 1. The blending amount of C. I. Pigment Blue 15:3 with respect to the total weight of the ink was 1 wt. %.

The same procedure as in the case of light cyan pigment ink 1 was repeated except that the ink composition was changed as shown in Table 1 to prepare light cyan pigment inks 2 and 3, and a normal cyan pigment ink.

In addition, light cyan dye ink 1 having the ink composition shown in Table 1 was prepared as follows.

First, 69 parts by weight of water, 27 parts by weight of glycerin and 2 parts by weight of DPGPE were mixed to prepare 98 parts by weight of an ink solvent. Subsequently, 2 parts by weight of a cyan water soluble dye (C. I. Direct Blue 199) was added to 98 parts by weight of the ink solvent under stirring. The mixture was continued to stir for 30 minutes and filtrated with a membrane filter having a pore size of 1 μm to prepare light cyan dye ink 1.

The same procedure as in the case of light cyan dye ink 1 was repeated except that the ink composition was changed as shown in Table 1 to prepare a light cyan dye ink 2, a normal cyan dye ink, blue dye inks 1 and 2, green dye inks 1 and 2, a yellow ink and a magenta ink.

(2) Determination of L*, a*, b*, C* and h

Each of the inks was filled into a predetermined ink cartridge, and the ink cartridge was attached to a digital multifunction device equipped with an ink-jet printer (MFC-5200J, product of Brother Industries, Ltd.). Subsequently, an object was solidly printed with the ink at a resolution of 1,200×1,200 dpi on glossy paper (KASSAI (a registered trade mark) glossy finishing, product of FUJI Photo Film Co., Ltd.). The solidly printed object was measured for L*, a* and b* by means of Spectrolino (product of Gretag Macbeth) (light source: $D_{65}$, viewing angle: 2°).

The values of C* and h were calculated according to the following equations (1) and (2) using the obtained measurement values. The results are shown in Table 1.

$$C^* = \sqrt{(a^*)^2 + (b^*)^2} \qquad \text{Equation (1)}$$

$$h = \tan^{-1}\left(\frac{b^*}{a^*}\right) \quad \text{(when } a^* \geq 0 \text{ and } b^* \geq 0\text{)} \qquad \text{Equation (2)}$$

$$h = 360 + \tan^{-1}\left(\frac{b^*}{a^*}\right) \quad \text{(when } a^* \geq 0 \text{ and } b^* < 0\text{)}$$

$$h = 180 + \tan^{-1}\left(\frac{b^*}{a^*}\right) \quad \text{(when } a^* < 0\text{)}$$

(3) Configuration of Ink Sets

The inks shown in Table 1 were combined as shown in Tables 2 and 3 to configure water-based ink sets for ink-jet recording. Each of Comparative Examples B5 and G5 corresponds to a conventional ink set.

(4) Evaluation of Ink Sets

For each of the ink sets shown in Tables 2 and 3, the inks constituting the ink set were filled into predetermined ink cartridges, and the ink cartridges were attached to a digital multifunction device equipped with an ink-jet printer (MFC-5200J, product of Brother Industries, Ltd.). Subsequently, the samples described hereinbelow were printed on glossy paper (KASSAI (a registered trade mark) glossy finishing, product of FUJI Photo Film Co., Ltd.).

For each of the ink sets comprising the cyan ink, the blue dye ink and the magenta ink (Table 2), a gradation sample of the cyan ink (the light cyan pigment ink, the light cyan dye ink, the normal cyan pigment ink or the normal cyan dye ink) was printed for graininess evaluation of cyan color and for gas resistance evaluation for a cyan color-printed part. In addition, a print pattern sample containing patches having various hues was printed by changing the mixing ratio of the cyan ink (the light cyan pigment ink, the light cyan dye ink, the normal cyan pigment ink or the normal cyan dye ink), the blue dye ink and the magenta ink. This print pattern sample was employed for color reproducibility evaluation of blue and cyan colors.

For each of the ink sets comprising the cyan ink, the green dye ink and the yellow ink (Table 3), a gradation sample of the cyan ink (the light cyan pigment ink, the light cyan dye ink, the normal cyan pigment ink or the normal cyan dye ink) was printed for graininess evaluation of cyan color and for gas resistance evaluation for a cyan color-printed part. In addition, a print pattern sample containing patches having various hues was printed by changing the mixing ratio of the cyan ink (the light cyan pigment ink, the light cyan dye ink, the normal cyan pigment ink or the normal cyan dye ink), the green dye ink and the yellow ink. This print pattern sample was employed for color reproducibility evaluation of green and cyan colors.

The patches of the obtained each sample were measured for a*, b* and L* by means of the same method as above. Subsequently, (a) graininess evaluation of cyan color, (b) evaluation of blue color reproducibility or (c) evaluation of green color reproducibility, (d) evaluation of cyan color reproducibility, (e) evaluation of gas resistance of a cyan color-printed part and (f) overall evaluation were performed for each of the ink sets as follows. The results are shown in Tables 2 and 3.

(a) Graininess Evaluation of Cyan Color

The patch for L*=90 in the above gradation sample was visually observed, and the graininess of cyan color was evaluated according to the following criteria. The evaluation results are shown in Tables 2 and 3.

A: Graininess is not found.
B: Graininess is hardly noticeable.
C: Graininess is noticeable. Practically problematic.

(b) Evaluation of Blue Color Reproducibility (b-1) Visual Evaluation

A patch having a hue angle (h) of 277°±5° was selected from the above-mentioned print pattern sample. Here, the above hue angle (h) corresponds to blue color. The selected blue color patch was visually observed to evaluate, based on the following criteria, whether or not the blue color was satisfactorily developed. The evaluation results are shown in Table 2.

A: High-density blue color is satisfactorily developed.
B: High-density blue color is developed.
C: High-density blue color is not satisfactorily developed.

(b-2) Chroma (C*) and Chroma Difference ($\Delta C^*_B$)

A patch having a hue angle (h) of 277°±5° (corresponding to blue color) and a lightness (L*) of 40±5 was selected from the above-mentioned print pattern sample, and chroma (C*) was calculated according to equation (1).

In addition, chroma difference ($\Delta C^*_B$) was calculated according to equation (3) below by use of the chroma (C*) of the patch (h=278°) of Comparative Example B5 serving as a comparison reference. The chroma difference ($\Delta C^*_B$) is the difference between the chroma (C*) of the above patch and the chroma (C*) of the patch of Comparative Example B5. The larger the chroma difference ($\Delta C^*_B$), the better the color reproducibility of high-density blue color. The evaluation results are shown in Table 2.

$$\Delta C^*_B = C^*_2 - C^*_1 \quad \text{Equation (3)}$$

$C^*_1$: C* of Comparative Example B5
$C^*_2$: C* of Examples and Comparative Examples (c) Evaluation of Green Color Reproducibility (c-1) Visual Evaluation A patch having a hue angle (h) of 200°±10° was selected from the above-mentioned print pattern sample. Here, the above hue angle (h) corresponds to green color. The selected green color patch was visually observed to evaluate, based on the following criteria, whether or not the green color was satisfactorily developed. The evaluation results are shown in Table 3.

A: High-density green color is satisfactorily developed.
B: High-density green color is developed.
C: High-density green color is not satisfactorily developed.

(c-2) Chroma (C*) and Chroma Difference ($\Delta C^*_G$)

A patch having a hue angle (h) of 200°±10° (corresponding to green color) and a lightness (L*) of 55±3 was selected from the above-mentioned print pattern sample, and chroma (C*) was calculated according to equation (1).

In addition, chroma difference ($\Delta C^*_G$) was calculated according to equation (4) below by use of the chroma (C*) of the patch (h=196°) of Comparative Example G5 as a comparison reference. The chroma difference ($\Delta C^*_G$) is the difference between the chroma (C*) of the above patch and the chroma (C*) of the patch of Comparative Example G5. The larger the chroma difference ($\Delta C^*_G$), the better the color reproducibility of high-density green color. The evaluation results are shown in Table 3.

$$\Delta C^*_G = C^*_4 - C^*_3 \quad \text{Equation (4)}$$

$C^*_3$: C* of Comparative Example G5
$C^*_4$: C* of Examples and Comparative Examples (d) Evaluation of Cyan Color Reproducibility (d-1) Visual Evaluation A patch having a hue angle (h) of 215° to 255° was selected from the above-mentioned print pattern sample. Here, the above hue angle (h) corresponds to cyan color. The selected cyan color patch was visually observed to evaluate, based on the following criteria, whether or not the cyan color was satisfactorily developed. The evaluation results are shown in Tables 2 and 3.

A: High-density cyan color is satisfactorily developed.
B: Color close to high-density cyan color is developed.
C: High-density cyan color is not satisfactorily developed.

(d-2) Chroma (C*) and Lightness Difference ($\Delta L^*$)

A patch having a hue angle (h) of 215° to 255° was selected from the above print pattern sample. When the hue angle (h) of a patch falls within the above range, the patch is categorized as a cyan color patch. The selection was made such that the selected patch had a lightness (L*) and a hue angle (h) closest to those of the patch showing the cyan color printed by use of a conventional ink set; i.e., the patch of Comparative Example B5 or G5 (h=234°, L*=54). Subsequently, chroma (C*) was calculated according to equation (1) above.

The lightness difference ($\Delta L^*$) between each selected patch and the patch of Comparative Example B5 or G5 was calculated according to the following equation (5). The larger value of the lightness difference ($\Delta L^*$) represents that high-density cyan color is less satisfactorily developed.

$$\Delta L^* = L^*_2 - L^*_1 \quad \text{Equation (5)}$$

$L^*_1$: L* of Comparative Example B5 or G5
$L^*_2$: L* of Examples and Comparative Examples (e) Evaluation of Gas Resistance of a Cyan Color-Printed Part An ozone resistance test as gas resistance evaluation was performed by use of the above gradation sample.

The ozone resistance test was performed by allowing a sample to stand under an atmosphere of an ozone concentration of 1 ppm, a chamber temperature of 24° C. and a humidity of 60% RH for 200 hours by use of the Ozone Weather Meter OMS-H (product of Suga Test Instruments Co., Ltd.).

For a cyan color patch having an OD value of 0.6 before the ozone resistance test, the OD value after the ozone resistance test was measured by means of the reflection densitometer RD-914 (product of Gretag Macbeth). An OD value reduction ratio with respect to the OD value (0.6) of the patch before the test was obtained from the following equation (6), and the obtained OD value reduction ratio was evaluated according to the following criteria. The evaluation results are shown in Tables 2 and 3.

$$OD \text{ value reduction ratio}(\%) = \frac{OD_b - OD_a}{OD_b} \times 100 \quad \text{Equation (6)}$$

$OD_b$: OD value before test (=0.6)

$OD_a$: OD value after test

A: The OD value reduction ratio is less than 30%.

B: The OD value reduction ratio is 30% or more.

(f) Overall Evaluation

Overall evaluation was conducted based on the evaluation results of the ink set according to the following criteria. The results are shown in Tables 2 and 3.

A: All of the evaluation results are rank A or rank B.

B: The evaluation results for the graininess evaluation of cyan color, the evaluation of blue or green color reproducibility, and the evaluation of cyan color reproducibility are rank A or rank B.

C: The evaluation results for the graininess evaluation of cyan color, the evaluation of blue or green color reproducibility, and the evaluation of cyan color reproducibility contain rank C.

TABLE 1

|  |  | Light cyan pigment ink 1 | Light cyan pigment ink 2 | Light cyan pigment ink 3 | Normal cyan pigment ink | Light cyan dye ink 1 | Light cyan dye ink 2 | Normal cyan dye ink | Blue dye ink 1 | Blue dye ink 2 | Green dye ink 1 | Green dye ink 2 | Yellow ink | Magenta ink |
|---|---|---|---|---|---|---|---|---|---|---|---|---|---|---|
| Ink Composition (wt. %) | C.I. Pigment Blue 15:3 | 1.0 | 0.7 | 0.4 | 2.0 | — | — | — | — | — | — | — | — | — |
|  | C.I. Direct Blue 199 | — | — | — | — | 2.0 | 1.5 | 3.0 | — | — | — | — | — | — |
|  | C.I. Reactive Blue 49 | — | — | — | — | — | — | — | 6.0 | — | — | — | — | — |
|  | C.I. Acid Blue 112 | — | — | — | — | — | — | — | — | 6.0 | — | — | — | — |
|  | C.I. Acid Green 3 | — | — | — | — | — | — | — | — | — | 6.0 | — | — | — |
|  | C.I. Acid Green 15 | — | — | — | — | — | — | — | — | — | — | 6.0 | — | — |
|  | C.I. Direct Yellow 86 | — | — | — | — | — | — | — | — | — | — | — | 0.4 | — |
|  | C.I. Direct Yellow 132 | — | — | — | — | — | — | — | — | — | — | — | 1.6 | — |
|  | C.I. Acid Red 289 | — | — | — | — | — | — | — | — | — | — | — | — | 1.5 |
|  | Glycerin | 27.0 | 27.0 | 27.0 | 27.0 | 27.0 | 27.0 | 27.0 | 27.0 | 27.0 | 27.0 | 27.0 | 27.0 | 26.0 |
|  | Dipropylene glycol-n-propyl ether | 2.0 | 2.0 | 2.0 | 2.0 | 2.0 | 2.0 | 2.0 | 2.0 | 2.0 | 2.0 | 2.0 | 2.0 | 2.0 |
|  | Polyoxyethylene lauryl ether ammonium sulfate (*1) | 1.0 | 0.7 | 0.4 | 2.0 | — | — | — | — | — | — | — | — | — |
|  | Water | 69.0 | 69.6 | 70.2 | 67.0 | 69.0 | 69.5 | 68.0 | 65.0 | 65.0 | 65.0 | 65.0 | 69.0 | 70.5 |
| Colorimetric system | L* | 63 | 69 | 77 | 46 | 60 | 64 | 54 | 40 | 42 | 49 | 41 | — | — |
|  | C* | 62 | 55 | 42 | 70 | 68 | 66 | 69 | 75 | 74 | 77 | 71 | — | — |
|  | h/° | 233 | 232 | 234 | 245 | 230 | 229 | 234 | 282 | 272 | 189 | 207 | — | — |

(*1) Average polymerization degree of oxyethylene = 12

*The ink composition (wt. %) represents the actual blending ratio of each ink component with respect to the total weight of an ink.

TABLE 2

|  |  |  | Example B1 | Example B2 | Example B3 | Example B4 | Example B5 | Example B6 | Comp. Ex. B1 |
|---|---|---|---|---|---|---|---|---|---|
| Ink |  | Cyan ink | Light cyan pigment ink 1 | Light cyan pigment ink 2 | Light cyan pigment ink 3 | Light cyan pigment ink 1 | Light cyan pigment ink 2 | Light cyan pigment ink 3 | Light cyan dye ink 1 |
|  |  | Blue ink | Blue dye ink 1 | Blue dye ink 1 | Blue dye ink 1 | Blue dye ink 2 | Blue dye ink 2 | Blue dye ink 2 | Blue dye ink 1 |
|  |  | Magenta ink | Magenta ink | Magenta ink | Magenta ink | Magenta ink | Magenta ink | Magenta ink | Magenta ink |
| Evaluation | Graininess of cyan color |  | B | B | A | B | B | A | B |
|  | Blue color reproduci- | Visual evaluation | A | A | A | A | A | A | A |
|  |  | L* | 40 | 40 | 40 | 42 | 42 | 42 | 40 |

TABLE 2-continued

|  |  |  | | | | | | | |
|---|---|---|---|---|---|---|---|---|---|
| | bility | C* | 75 | 75 | 75 | 74 | 74 | 74 | 75 |
| | | h/° | 282 | 282 | 282 | 272 | 272 | 272 | 282 |
| | | Chroma difference ($\Delta C^*_B$) | +15 | +15 | +15 | +14 | +14 | +14 | +15 |
| Cyan color reproducibility | Visual evaluation | | B | B | B | B | B | B | B |
| | | L* | 52 | 56 | 57 | 51 | 57 | 57 | 56 |
| | | C* | 68 | 67 | 66 | 69 | 66 | 65 | 66 |
| | | h/° | 245 | 245 | 241 | 245 | 246 | 247 | 238 |
| | | Lightness difference ($\Delta L^*$) | −2 | +2 | +3 | −3 | +3 | +3 | +2 |
| | Gas resistance of cyan color-printed part | | A | A | A | A | A | A | B |
| | Overall evaluation | | A | A | A | A | A | A | B |

| | | | Comp. Ex. B2 | Comp. Ex. B3 | Comp. Ex. B4 | Comp. Ex. B5 | Comp. Ex. B6 | Comp. Ex. B7 |
|---|---|---|---|---|---|---|---|---|
| Ink | Cyan ink | | Normal cyan pigment ink | Normal cyan pigment ink | Light cyan pigment ink 2 | Normal cyan dye ink | Normal cyan dye ink | Light cyan dye ink 2 |
| | Blue ink | | — | Blue dye ink 1 | — | — | Blue dye ink 1 | — |
| | Magenta ink | | Magenta ink | Magenta ink | Magenta ink | Magenta ink | Magenta ink | Magenta ink |
| Evaluation | Graininess of cyan color | | C | C | B | C | C | A |
| | Blue color reproducibility | Visual evaluation | B | A | C | B | A | C |
| | | L* | 37 | 40 | 45 | 42 | 40 | 39 |
| | | C* | 69 | 75 | 57 | 60 | 75 | 57 |
| | | h/° | 273 | 282 | 274 | 278 | 282 | 277 |
| | | Chroma difference ($\Delta C^*_B$) | +9 | +15 | −3 | Comparison reference | +15 | −3 |
| | Cyan color reproducibility | Visual evaluation | A | A | C | A | A | C |
| | | L* | 46 | 46 | 69 | 54 | 54 | 64 |
| | | C* | 70 | 70 | 55 | 69 | 69 | 66 |
| | | h/° | 245 | 245 | 232 | 234 | 234 | 229 |
| | | Lightness difference ($\Delta L^*$) | −8 | −8 | +14 | Comparison reference | ±0 | +10 |
| | Gas resistance of cyan color-printed part | | A | A | A | B | B | B |
| | Overall evaluation | | C | C | C | C | C | C |

TABLE 3

| | | | Example G1 | Example G2 | Example G3 | Example G4 | Comp. Ex. G1 | Comp. Ex. G2 | Comp. Ex. G3 | Comp. Ex. G4 | Comp. Ex. G5 | Comp. Ex. G6 | Comp. Ex. G7 |
|---|---|---|---|---|---|---|---|---|---|---|---|---|---|
| Ink | Cyan ink | | Light cyan pigment ink 1 | Light cyan pigment ink 2 | Light cyan pigment ink 1 | Light cyan pigment ink 2 | Light cyan dye ink | Normal cyan pigment ink | Normal cyan pigment ink | Light cyan pigment ink 2 | Normal cyan dye ink | Normal cyan dye ink | Light cyan dye ink 2 |
| | Green ink | | Green dye ink 1 | Green dye ink 1 | Green dye ink 2 | Green dye ink 2 | Green dye ink 1 | — | Green dye ink 1 | — | — | Green dye ink 1 | — |
| | Yellow ink | | Yellow ink | Yellow ink | Yellow ink | Yellow ink | Yellow ink | Yellow ink | Yellow ink | Yellow ink | Yellow ink | Yellow ink | Yellow ink |
| Evaluation | Graininess of cyan color | | B | B | B | B | B | C | C | B | C | C | A |
| | Green color reproducibility | Visual evaluation | A | A | A | A | A | B | A | C | B | A | C |
| | | L* | 56 | 56 | 54 | 54 | 56 | 52 | 56 | 56 | 56 | 56 | —*1 |
| | | C* | 71 | 71 | 72 | 72 | 71 | 68 | 71 | 65 | 68 | 71 | —*1 |
| | | h/° | 191 | 191 | 209 | 209 | 191 | 198 | 191 | 197 | 196 | 191 | —*1 |

TABLE 3-continued

| | | Example G1 | Example G2 | Example G3 | Example G4 | Comp. Ex. G1 | Comp. Ex. G2 | Comp. Ex. G3 | Comp. Ex. G4 | Comp. Ex. G5 | Comp. Ex. G6 | Comp. Ex. G7 |
|---|---|---|---|---|---|---|---|---|---|---|---|---|
| | Chroma difference ($\Delta C^*_G$) | +3 | +3 | +4 | +4 | +3 | ±0 | +3 | −3 | Comparison reference | +3 | — |
| Cyan color reproducibility | Visual evaluation | B | B | B | B | B | A | A | C | A | A | C |
| | $L^*$ | 54 | 57 | 55 | 57 | 56 | 46 | 46 | 69 | 54 | 54 | 64 |
| | $C^*$ | 66 | 64 | 64 | 62 | 68 | 70 | 70 | 55 | 69 | 69 | 66 |
| | $h/°$ | 239 | 238 | 243 | 244 | 228 | 245 | 245 | 232 | 234 | 234 | 229 |
| | Lightness difference ($\Delta L^*$) | ±0 | +3 | +1 | +3 | +2 | −8 | −8 | +15 | Comparison reference | ±0 | +10 |
| Gas resistance of cyan color-printed part | | A | A | A | A | B | A | A | A | B | B | B |
| Overall evaluation | | A | A | A | A | B | C | C | C | C | C | C |

*[1]Green color at $L^* = 53 ± 3$ cannot be developed.

As shown in Table 2, in each of Examples B1 to B6, the graininess was hardly noticeable in a low-density printed part ($L^*=90$) of cyan color, since the light cyan pigment ink having a lightness ($L^*$) of about 60 or more was employed. Further, since the blue dye ink having a lightness $L^*$ of about 45 or less was employed, the color reproduction range of blue color was large (i.e., the $\Delta C^*_B$ value was large) in comparison with the conventional ink set (Comparative Example B5). In this case, high-density cyan color could also be developed which was comparable to the cyan color which may be developed by the conventional ink set (Comparative Example B5). In these Examples, blue color can be developed by the blue dye ink alone. Therefore, a landing error due to superposition was not generated in text in blue color, thereby obtaining sharp printing quality. In addition, since the coloring agent of the light cyan ink was pigment, the gas resistance was improved in a cyan color-printed part.

On the other hand, in Comparative Example B1, the gas resistance was poor in a cyan color-printed part, since the coloring agent of the light cyan ink was dye.

In Comparative Examples B2 and B3, the graininess was noticeable in a low-density printed part ($L^*=90$) of cyan color, since the normal cyan pigment ink having a lightness ($L^*$) of less than about 60 was employed. In addition, in Comparative Example B2, since the blue ink was not employed, the color reproduction range of blue color was inferior to that of the ink sets of the present invention (Examples B1 to B6).

In Comparative Example B4, since the blue ink was not employed, the color reproduction range of blue color was narrow (i.e., the $\Delta C^*_B$ value was small) in comparison with the ink sets of the present invention (Examples B1 to B6), and the color reproduction range of high-density cyan color was insufficient.

In Comparative Examples B5 and B6, since the normal cyan dye ink having a lightness ($L^*$) of less than about 60 was employed, the graininess was noticeable in a low-density printed part ($L^*=90$) of cyan color, and the gas resistance was poor in a cyan color-printed part. In addition, in Comparative Example B5, since the blue ink was not employed, the color reproduction range of blue color was inferior to those of the ink sets of the present invention (Examples B1 to B6).

In Comparative Example B7, since the blue ink was not employed, the color reproduction range of blue color was narrow (i.e., the $\Delta C^*_B$ value was small) in comparison with the ink sets of the present invention (Examples B1 to B6), and the color reproduction range of high-density cyan color was insufficient. In addition, since the coloring agent of the cyan ink was dye, the gas resistance was poor in a cyan color-printed part.

As described above, the ink sets of Examples B1 to B6 were superior to the ink sets of Comparative Examples B1 to B7 in terms of: reducing graininess in a low-density printed part of cyan color without reducing the color reproduction range of cyan color; extending the color reproduction range of blue color; and improving gas resistance in a cyan color-printed part.

Moreover, as shown in Table 3, in each of Examples G1 to G4, the graininess was hardly noticeable in a low-density printed part ($L^*=90$) of cyan color, since the light cyan pigment ink having a lightness ($L^*$) of about 60 or more was employed. Further, since the green dye ink having a lightness ($L^*$) of about 60 or less was employed, the color reproduction range of green color was large (i.e., the $\Delta C^*_G$ value was large) in comparison with the conventional ink set (Comparative Example G5). In this case, high-density cyan color could also be developed which was comparable to the cyan color which may be developed by the conventional ink set (Comparative Example G5). In these Examples, green color can be developed by the green dye ink alone. Therefore, a landing error due to superposition was not generated in text in green color, thereby obtaining sharp printing quality. In addition, since the coloring agent of the cyan ink was pigment, the gas resistance was enhanced and improved in a cyan color-printed part.

On the other hand, in Comparative Example G1, the gas resistance was poor in a cyan color-printed part, since the light cyan dye ink was employed.

In Comparative Examples G2 and G3, the graininess was noticeable in a low-density printed part ($L^*=90$) of cyan color, since the normal cyan pigment ink was employed. In addition, in Comparative Example G2, since the green ink was not employed, the color reproduction range of green color was inferior to those of the ink sets of the present invention (Examples G1 to G4).

In Comparative Example G4, although the light cyan pigment ink having a lightness (L*) of about 60 or more was employed, the green ink was not employed. Therefore, the color reproduction range of green color was narrow (i.e., the $\Delta C^*_G$ value was small) in comparison with the ink sets of the present invention (Examples G1 to G4), and the color reproduction range of high-density cyan color was insufficient.

In Comparative Examples G5 and G6, since the normal cyan dye ink having a lightness (L*) of less than about 60 was employed, the graininess was noticeable in a low-density printed part (L*=90) of cyan color, and the gas resistance was poor in a cyan color-printed part. In addition, in Comparative Example G5, since the green ink was not employed, the color reproduction range of green color was narrow (i.e., the $\Delta C^*_G$ value was small) in comparison with the ink sets of the present invention (Examples G1 to G4).

In Comparative Example G7, although the light cyan dye ink having a lightness (L*) of about 60 or more was employed, the green ink was not employed. Therefore, the color reproduction range of green color was evidently narrower, and the color reproduction range of high-density cyan color was insufficient. In addition, since the coloring agent of the cyan ink was dye, the gas resistance was poor in a cyan color-printed part.

As described above, the ink sets of Examples G1 to G4 were superior to the ink sets of Comparative Examples G1 to G7 in terms of: reducing graininess in a low-density printed part of cyan color without reducing the color reproduction range of cyan color; extending the color reproduction range of green color; and improving gas resistance in a cyan color-printed part.

According to the water-based ink set for in-jet recording of the present invention, the following can be achieved: the reduction of graininess in a low-density printed part in the cyan direction; the improvement of gas resistance; and the extension of color reproduction ranges. Therefore, the ink set of the invention is useful when a color image is reproduced by a printer for ink-jet recording.

The entire disclosure of the specification, claims and summary of Japanese Patent Application No. 2005-246870 filed on Aug. 26, 2005 is hereby incorporated by reference.

What is claimed is:

1. A water-based ink set for ink-jet recording comprising a cyan pigment ink employing pigment as a coloring agent and a blue dye ink employing dye as a coloring agent and/or a green dye ink employing dye as a coloring agent, wherein
the cyan pigment ink is a light cyan pigment ink having a lightness (L*) of about 60 or more in the L*a*b* colorimetric system.

2. The water-based ink set for ink-jet recording according to claim 1, wherein
a normal cyan ink having a lightness (L*) of less than about 60 in the L*a*b* colorimetric system is not included as the cyan pigment ink.

3. The water-based ink set for ink-jet recording according to claim 1, wherein
the light cyan pigment ink has the lightness (L*) in a range of from about 60 to about 85 in the L*a*b* colorimetric system.

4. The water-based ink set for ink-jet recording according to claim 1, wherein
the light cyan pigment ink has a hue angle (h) in a range of from about 215° to about 255° in the L*a*b* colorimetric system.

5. The water-based ink set for ink-jet recording according to claim 1, wherein
the light cyan pigment ink has a chroma (C*) in a range of from about 40 to about 70 in the L*a*b* colorimetric system.

6. The water-based ink set for ink-jet recording according to claim 1, wherein
the blue dye ink has a lightness (L*) of about 45 or less in the L*a*b* colorimetric system.

7. The water-based ink set for ink-jet recording according to claim 1, wherein
the blue dye ink has a lightness (L*) in a range of from about 35 to about 45 in the L*a*b* colorimetric system.

8. The water-based ink set for ink-jet recording according to claim 1, wherein
the blue dye ink has a hue angle (h) in a range of from about 270° to about 285° in the L*a*b* colorimetric system.

9. The water-based ink set for ink-jet recording according to claim 1, wherein
the blue dye ink has a chroma (C*) in a range of from about 70 to about 80 in the L*a*b* colorimetric system.

10. The water-based ink set for ink-jet recording according to claim 1, wherein
the green dye ink has a lightness (L*) of about 60 or less in the L*a*b* colorimetric system.

11. The water-based ink set for ink-jet recording according to claim 1, wherein
the green dye ink has a lightness (L*) in a range of from about 35 to about 60 in the L*a*b* colorimetric system.

12. The water-based ink set for ink-jet recording according to claim 1, wherein
the green dye ink has a hue angle (h) in a range of from about 175° to about 215° in the L*a*b* colorimetric system.

13. The water-based ink set for ink-jet recording according to claim 1, wherein
the green dye ink has a chroma (C*) in a range of from about 60 to about 80 in the L*a*b* colorimetric system.

14. The water-based ink set for ink-jet recording according to claim 1, further comprising a yellow ink and/or a magenta ink.

15. The water-based ink set for ink-jet recording according to claim 1, further comprising a black ink.

16. An ink-jet recording method employing the water-based ink set for ink-jet recording according to claim 1.

* * * * *